(No Model.) 2 Sheets—Sheet 1.
W. A. WEST.
RECEIVER FOR TELEPHONIC TELEGRAPHS.
No. 329,982. Patented Nov. 10, 1885.
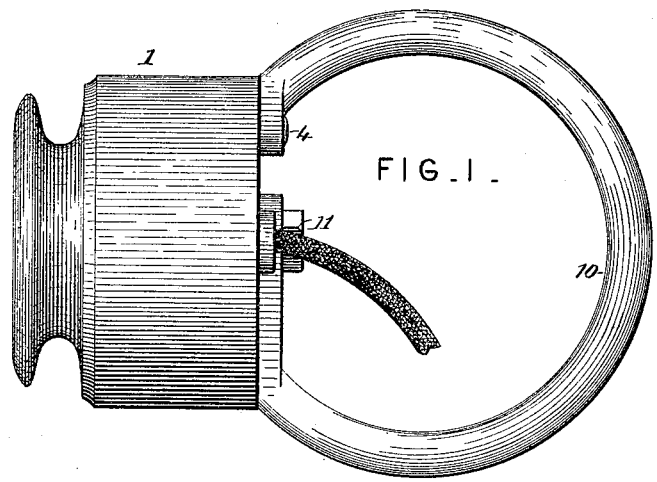
FIG. I.
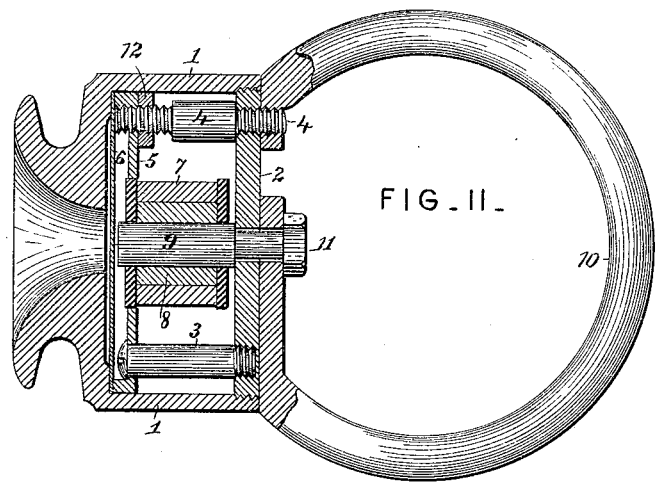
FIG. II.
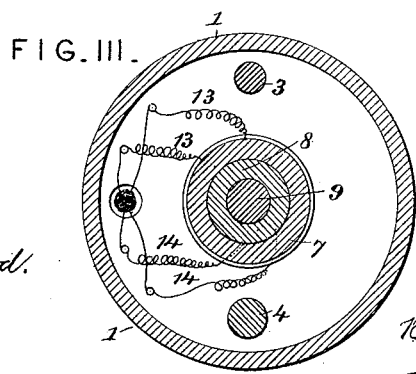
FIG. III.
Attest:
Geo. T. Smallwood.
Edward Steer
Inventor
William A. West
By Knight Bros
attys
N. PETERS, Photo-Lithographer, Washington, D. C.

(No Model.) 2 Sheets—Sheet 2.
W. A. WEST.
RECEIVER FOR TELEPHONIC TELEGRAPHS.
No. 329,982. Patented Nov. 10, 1885.
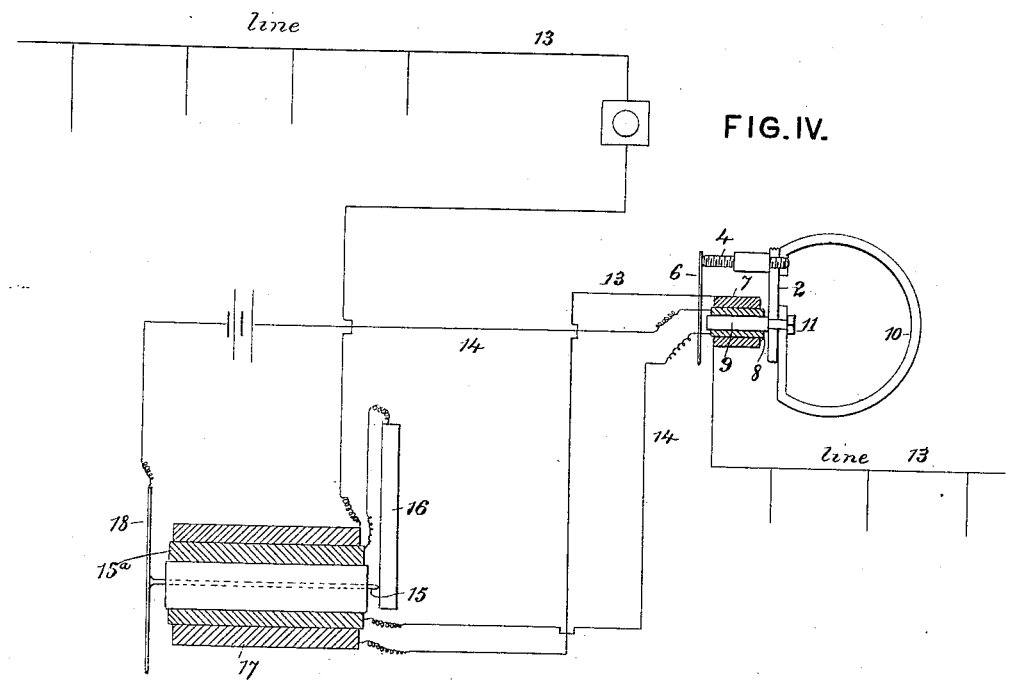
FIG. IV.
Attest:
Geo. T. Smallwood.
Edward Stew.
Inventor:
William A. West,
By Knight Bros.
attys.

United States Patent Office.

WILLIAM A. WEST, OF BELLEFONTAINE, OHIO, ASSIGNOR TO THE WEST TELEPHONE COMPANY, (LIMITED,) OF KENOSHA, WISCONSIN.

RECEIVER FOR TELEPHONIC TELEGRAPHS.

SPECIFICATION forming part of Letters Patent No. 329,982, dated November 10, 1885.

Application filed November 20, 1884. Serial No. 148,447. (No model.)

*To all whom it may concern:*

Be it known that I, WILLIAM A. WEST, a citizen of the United States, residing at Bellefontaine, in the county of Logan and State of Ohio, have invented certain new and useful Improvements in Telephonic Telegraphs, of which the following is a specification.

My present invention has for its object to intensify the action of a telephonic receiver forming part of a system in which the helix of the receiver-magnet forms part of a local circuit including the primary helix of an inductorium in the transmitter and the fixed and movable contacts. To this end I provide the receiver with a permanent magnet of horseshoe form, one pole being placed in contact with the diaphragm, and the other pole arranged opposite the vibratory part of the diaphragm, and being wound with a primary helix in a local circuit including the fixed and movable contacts and primary of the inductorium of the transmitter, and also with a secondary helix in circuit with the secondary of such inductorium and with the line.

In order that the invention may be better understood, I will proceed to describe it with reference to the accompanying drawings, in which—

Figure I is a side elevation of my improved receiver. Fig. II is a vertical section thereof. Fig. III is a similar section at right angles to Fig. II. Fig. IV is a diagram showing the receiver in circuit with a reactionary transmitter.

The case 1 of the receiver is fixed to a plate, 2, of vulcanite or similar material, connected by screws 3 4 with a second plate, 5, of non-magnetic material, between which and the case is fastened a diaphragm, 6. Centrally within the plate 5 is supported an inductorium, 7 8, whose core 9 forms one pole of the horseshoe-magnet 10, and at the same time serves by means of the nut 11, in conjunction with the screw 4, to fix the said horseshoe-magnet to the plate 2 and case 1. The screw 4 passes through both plates 2 and 5, and is in magnetic contact with both the magnet 10 and the diaphragm 6. Thus the diaphragm in reality forms one pole of the horseshoe-magnet, and its center being in close proximity to the other pole, 9, a much stronger inductive action of the instrument is obtained.

The arrangement of the instrument in circuit is shown in Fig. IV. The primary helix 8 of the receiver forms part of a local circuit, 14, including the fixed and movable contacts 15 16 and the primary helix $16^a$ of an inductorium in the transmitter. The secondary helix 7 of the receiver, on the other hand, is in the line-circuit 13, with the bell, and the secondary helix 17 of the inductorium in the transmitter. The inductorium of the transmitter is preferably arranged around the fixed contact or needle 15 and opposite the transmitting-diaphragm 18, as shown. The wires 13 13 14 14 are twisted together within the receiver, and pass through a hole in the plate 2 in the form of a cable, as shown in Figs. I and III.

It will be seen that any variation of current on the line will act simultaneously in the secondaries of inductoriums in both the receiver and the transmitter. The cores of both inductoriums are affected, and while the core 9 acts directly in customary manner upon the diaphragm 6 of the receiver, the core of the transmitter-inductorium will correspondingly affect the contacts 15 16, and the resulting changes in the local circuit including the primaries of both inductoriums will add to and intensify the actions of both secondaries on their cores and the consequent action of the core of the receiver-inductorium upon the diaphragm 6 of the receiver.

Having thus described my invention, the following is what I claim as new therein and desire to secure by Letters Patent:

1. A receiver having a permanent magnet of horseshoe form, a diaphragm in contact with one pole of said magnet, and a primary helix surrounding the other pole of said magnet, in combination with a transmitter containing a diaphragm, fixed and movable contacts, and an inductorium, substantially as described, and a main-line circuit including the secondary helix of the inductorium, and a local circuit including the fixed and movable contacts and the primary helices of both the receiver and the transmitter, substantially as set forth.

2. A receiver having a permanent magnet of horseshoe form, a diaphragm in contact with one pole of said magnet, and an inductorium surrounding the other pole of said magnet, in combination with a transmitter containing a diaphragm, fixed and movable contacts, and an inductorium, substantially as described, a main-line circuit including the secondary helices of the two inductoriums, and a local circuit including the fixed and movable contacts and the primary helices of the two inductoriums, substantially as set forth.

W. A. WEST.

Witnesses:
 OCTAVIUS KNIGHT,
 HARRY E. KNIGHT.